(12) United States Patent
Hue et al.

(10) Patent No.: US 9,964,781 B2
(45) Date of Patent: May 8, 2018

(54) DRIVING ASSISTANCE DEVICE, METHOD AND COMPUTER PROGRAM THAT CAN BE STORED IN A MEMORY OF A MOBILE TERMINAL IN ORDER TO OPERATE THE DEVICE

(71) Applicant: Valeo Vision, Bobigny (FR)

(72) Inventors: David Hue, Butry sur Oise (FR); Hafid El Idrissi, Pantin (FR); Kostadin Beev, Emerainville (FR); Marc Rocklinger, Bonne (FR); Steed Gratien, Hacheres (FR)

(73) Assignee: VALEO VISION, Bobigny (FR)

( * ) Notice: Subject to any disclaimer, the term of this patent is extended or adjusted under 35 U.S.C. 154(b) by 0 days. days.

(21) Appl. No.: 14/916,647

(22) PCT Filed: Sep. 25, 2014

(86) PCT No.: PCT/EP2014/070581
§ 371 (c)(1),
(2) Date: Mar. 4, 2016

(87) PCT Pub. No.: WO2015/044321
PCT Pub. Date: Apr. 2, 2015

(65) Prior Publication Data
US 2016/0216536 A1 Jul. 28, 2016

(30) Foreign Application Priority Data
Sep. 26, 2013 (FR) ...................................... 13 59276

(51) Int. Cl.
*G02C 7/10* (2006.01)
*G02F 1/01* (2006.01)
*G02C 11/00* (2006.01)
*B60J 3/04* (2006.01)

(52) U.S. Cl.
CPC ................ *G02C 7/101* (2013.01); *B60J 3/04* (2013.01); *G02C 11/10* (2013.01); *G02F 1/0121* (2013.01)

(58) Field of Classification Search
CPC . G02C 7/101; G02C 11/10; B60J 3/04; G02F 1/0121
USPC ...................................................... 351/159.6
See application file for complete search history.

(56) References Cited

U.S. PATENT DOCUMENTS

| 7,134,707 | B2 | 11/2006 | Isaac | |
|---|---|---|---|---|
| 8,140,219 | B2 | 3/2012 | Cernasov | |
| 2006/0175859 | A1 | 8/2006 | Isaac | |
| 2009/0204291 | A1* | 8/2009 | Cernasov | ............... G02C 7/101 701/36 |
| 2015/0323795 | A1* | 11/2015 | Alton | ................ G02B 27/0172 349/11 |

(Continued)

*Primary Examiner* — William R Alexander
*Assistant Examiner* — Grant Gagnon
(74) *Attorney, Agent, or Firm* — Oblon, McClelland, Maier & Neustadt, L.L.P.

(57) ABSTRACT

A device for assisting in the driving of a motor vehicle, the assistance device comprising a screen with variable light transmission, intended to be arranged between a road scene and a driver of the vehicle, and a control or control means for controlling a transmission coefficient of the screen with variable light transmission. According to the invention, the screen and the control or control means are configured so as to be able to be embedded on the vehicle as different components of an after-sale product.

19 Claims, 1 Drawing Sheet

(56) References Cited

U.S. PATENT DOCUMENTS

2016/0085131 A1* 3/2016 Lam .......................... B60J 3/04
359/244

* cited by examiner

DRIVING ASSISTANCE DEVICE, METHOD AND COMPUTER PROGRAM THAT CAN BE STORED IN A MEMORY OF A MOBILE TERMINAL IN ORDER TO OPERATE THE DEVICE

CROSS-REFERENCE TO RELATED APPLICATIONS

This application is the U.S. National Phase application of PCT Application No. PCT/EP2014/070581 filed Sep. 25, 2014, which claims priority to the French application 1359276 filed on Sep. 26, 2013, which applications are incorporated herein by reference and made a part hereof.

BACKGROUND OF THE INVENTION

1. Field of the Invention

The invention relates to a device for assisting in the driving of a motor vehicle and a method and a computer program for implementing the device.

2. Description of the Related Art

While a vehicle is moving, its driver has to permanently look outside of the vehicle to warn of any hazard likely to provoke an accident. Now, the view of the driver is regularly disrupted by the outside light, whether from glare due to the sun, due to the lights of an incoming vehicle or of a following vehicle, or else by abrupt brightness variation such as when entering or leaving a tunnel.

In order to improve the comfort and the safety of the driver, a number of solutions have been proposed. One of them consists in using a screen with variable transmission of the brightness, in the form, for example, of spectacles worn by the driver, the transparency of which varies as a function of a transmission coefficient applied to the screen. The transmission coefficient takes into account the brightness and the screen attenuates the quantity of light transmitted when necessary. In the known solutions, the computation of the transmission coefficient is performed using embedded processing means provided, in series production, on the vehicle.

Nevertheless, these solutions do not enable the driver of a motor vehicle, in which the device has not been installed when manufacturing the vehicle, to be able to profit from their functionalities.

One solution that can be envisaged for resolving this problem is to provide the processing means in the spectacles but such a solution leads to a high degree of sophistication thereof. In case of loss or damage to the spectacles, the replacement cost is thus high.

The invention aims to mitigate at least some of the drawbacks of the known driving assistance devices and methods.

SUMMARY OF THE INVENTION

To this end, the invention thus proposes a device for assisting in the driving of a motor vehicle, the assistance device comprising a screen with variable light transmission, intended to be arranged between the road scene and a driver of the vehicle, and means for controlling a transmission coefficient of the screen with variable transmission. According to the invention, the screen and the control means are configured so as to be able to be embedded on the vehicle as different components of an after-sale product.

It will thus be understood that neither the screen nor the control means form part of the vehicle when it has been manufactured. They are, on the contrary, configured to be able to be embedded in the vehicle after it has left the factory, notably at any time in the life of the vehicle, from when it is commissioned to when it is scrapped. They will in particular be able to be sold and/or shipped independently of the vehicle.

The invention can thus be used in any vehicle, without the latter having any particular series-production equipment. Furthermore, since the control means are not incorporated in the screen, the technical sophistication and the cost of each of the components of the device are limited.

According to different embodiments, which will be able to be taken together or separately:
- the screen comprises spectacles;
- the device comprises a support incorporating the control means, the support being configured to be fixed in the vehicle, the support comprises means for electrically powering the control means;
- the control means are dedicated to the device;
- the control means are configured to be installed permanently on the vehicle;
- the control means are configured to exchange information with a mobile data processing terminal, notably a mobile telephone and/or tablet,
- the control means are configured to take account of the data to determine the transmission coefficient;
- the control means are configured to be mobile with the driver of the vehicle;
- the device comprises a mobile data processing terminal, notably a mobile telephone and/or tablet, equipped with the control means,
- the device comprises a brightness sensor;
- the control means are configured to take account of a brightness level recorded by the brightness sensor to determine the transmission coefficient;
- the brightness sensor is configured so as to be able to be embedded on the vehicle as a component of the after-sale product, distinct from the screen;
- the brightness sensor is incorporated in the support;
- the control means are configured to process one or more types of information out of:
  a speed of the vehicle,
  a positioning of the vehicle,
  the control means configured to take account of the information to determine the transmission coefficient;
- the control means are configured to transmit a control signal to the screen with variable transmission;
- the control means comprise a transmitter of remote control waves suitable for transmitting the control signal to a receiver of the screen with variable transmission;
- the receiver is able to control the transmission coefficient of the screen with variable transmission;
- the remote control wave transmitter is configured to transmit the control signal according to a wireless communication protocol.

The invention relates also to a screen and/or control means specially adapted to be used in the assistance device described above.

The invention relates also to a method for controlling, notably remotely, the light transmission coefficient, implementing the device.

The method will advantageously comprise a step of setting thresholds, notably brightness thresholds, and a step of computing the transmission coefficient using the thresholds. The method will also be able to comprise a step of selecting filtering laws for the computation of the light transmission coefficient.

The invention relates also to a computer program, that can be stored in a memory of a mobile data processing terminal as described above, the program comprising instructions for remotely controlling the transmission coefficient. It will, in particular, be able to be a digital application that can be downloaded remotely onto the mobile data processing terminal.

These and other objects and advantages of the invention will be apparent from the following description, the accompanying drawings and the appended claims.

BRIEF DESCRIPTION OF THE ACCOMPANYING DRAWINGS

Other aims, features and advantages of the invention will become apparent on reading the following description given purely as a nonlimiting example and which refers to the attached figures in which.

DETAILED DESCRIPTION OF THE PREFERRED EMBODIMENTS

Figure 1:
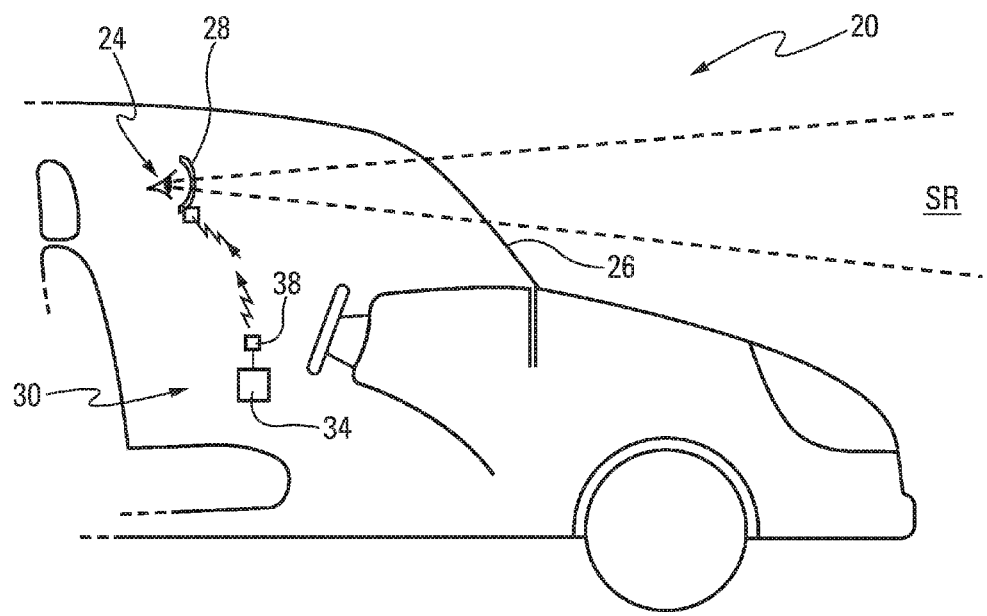
FIG. 1 is a schematic view in partial cross section of a vehicle in which a device according to the invention is used.

FIG. 1 schematically represents, in partial cross section, a vehicle 20 in which an assistance device according to an embodiment of the invention is used.

The vehicle 20 is controlled by a driver, symbolized by his or her eye 24. The road scene SR corresponds to what the driver 24 of the vehicle 20 observes. The driver 24 here observes the road scene SR in front of the vehicle 20 and through the windshield 26.

The device according to the invention comprises a screen 28 with variable light transmission 28. The screen with variable light transmission 28 is arranged in the field of vision of the driver 24, between the latter and the road scene SR. The screen with variable light transmission 28 is, for example, as represented in FIG. 1, a pair of spectacles 28, worn by the driver 24, like sunglasses or corrective glasses, just one spectacle lens having been represented in FIG. 1. The screen with variable light transmission 28 can also be arranged in place of the sunscreen, in front of the driver 24. In all cases, the screen with variable light transmission 28 is removable, that is to say able to be embedded on the vehicle 20 as a component of an after-sale product. Such a screen with variable light transmission 28 comprises, for example, a combination of polarizers and a liquid crystal screen. It will also be able to be comprised of electromechanical mirrors (MEMS).

When it is in the active phase (that is to say operating), the device controls a transmission coefficient of the screen with variable light transmission 28, notably by a pulsed signal. The aim of this is for the screen with variable light transmission 28 to have its transmission coefficient at the maximum (that is to say that the transparency of the screen with variable light transmission 28 is at the maximum) for a certain period during which the driver 24 sees the road scene SR. Another aim is for the screen with variable light transmission 28 to have its transmission coefficient at the minimum (that is to say that the transparency of the screen with variable light transmission 28 is at the minimum) for another period, during which the outside lightings of the road scene SR are attenuated.

For this, the device comprises control means or control 30 which here generate the pulsed signal intended to control the screen with variable light transmission 28. The pulsed signal is established, for example, in a processing unit 34.

The pulsed signal will be able to be a periodic signal of period T, the amplitude of which varies between a minimum Min and a maximum Max. The minimum Min corresponds to a transmission coefficient at the minimum for the screen with variable light transmission 28. In the same way, the maximum Max corresponds to a transmission coefficient at the maximum for the screen with variable light transmission 28.

It will in particular be possible to characterize the pulsed signal by a duty cycle which is equal to t/T, t corresponding to the time in which the value of the pulsed signal is at the maximum and T to the period of the pulsed signal. In practice, the pulsed signal is used to control the transmission coefficient of the screen with variable light transmission 28 by choosing the value of t.

Thus, for a value of t equal to T/2, in other words for a duty cycle of 50%, the screen with variable light transmission 28 has its transmission coefficient at the maximum for half a period and at the minimum for half a period, and the result is equivalent to a mean transmission coefficient equal to the mean between the maximum transmission coefficient and the minimum transmission coefficient.

The control means 30 are further configured to transmit a control signal, containing the pulsed signal, to the screen 28 with variable light transmission 28.

For that, the control means 30 comprise, for example, a transmitter 38 of remote control waves, suitable for transmitting the control signal to the support or receiver 40 of the screen with variable light transmission 28. The transmitter 38 is here linked to the processing unit 34.

The support or receiver 40 of the screen with variable light transmission 28 is advantageously able to control the transmission coefficient of the screen with variable light transmission 28, in particular from the pulsed signal. It will be understood thereby that it is configured to apply to the screen with variable light transmission 28 commands to activate the liquid crystal screen and/or electromechanical mirrors, corresponding to the pulsed signal.

The control means, in particular the remote control wave transmitter 38, are configured to transmit the control signal according to a wireless communication protocol. It will be able to be the protocol corresponding to the IEEE 802.15.1 standards and all of its extensions (commonly referred to by the registered trademark Bluetooth) or IEEE 802.11 standards (commonly referred to by the registered trademark Wi-Fi).

According to the invention, the screen with variable light transmission 28 and the control means 30 are configured so as to be able to be embedded on the vehicle 20 as different components of an after-sale product, suitable for communicating with one another, preferably independently of the vehicle 20. The assistance device according to the invention can in this way be acquired by the driver 24 independently of his or her vehicle 20. It will in particular be able to be used in vehicles 20 comprising no specific preinstalled equipment for controlling the transmission coefficient of the screen with variable light transmission 28. Furthermore, the control means 30 are distinct from the screen with variable light transmission 28 which makes it possible to limit the sophistication of each of the components.

Figure 2:
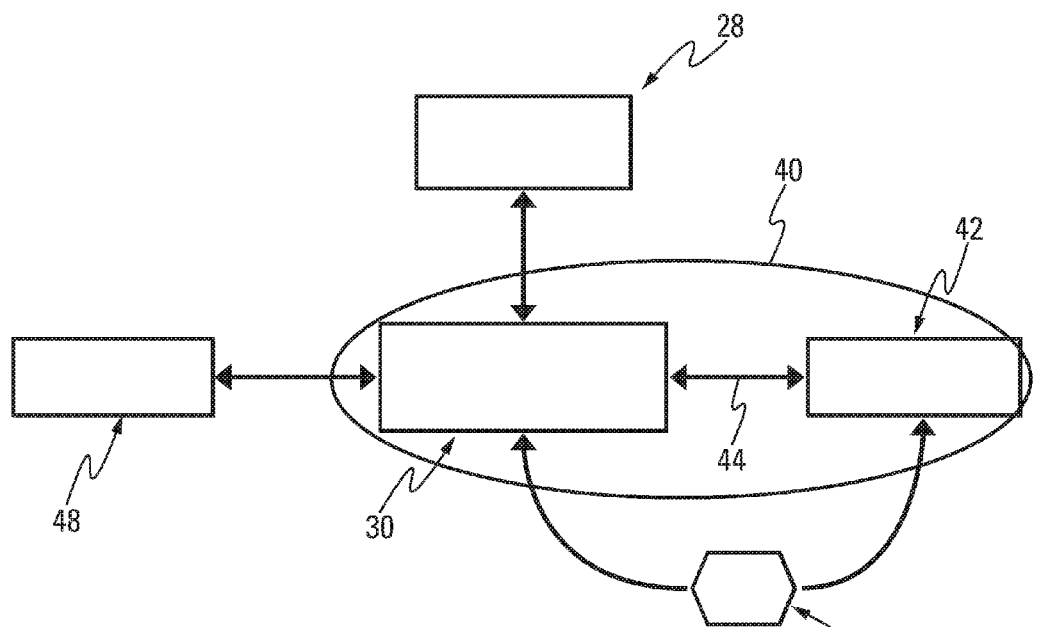
FIG. 2 is a schematic view of the assistance device according to an embodiment of the invention.

As illustrated in FIG. 2, according to a first aspect of the invention, the device comprises a support or receiver 40 incorporating the control means 30. The support or receiver 40 is advantageously configured to be fixed in the vehicle 20, for example on its dashboard and/or windshield, notably using a sucker, not illustrated.

The device further comprises a brightness sensor 42, communicating with the control means 30. The brightness sensor 42 will be able to take any form suited to its function, notably a photometric sensor, camera or the like. The brightness sensor 42 is advantageously configured so as to be able to be embedded on the vehicle 20 as a component of the after-sale product, while remaining distinct from the screen with variable light transmission 28. In other words, it is not incorporated in the spectacles. It is here incorporated in the support or receiver 40. It will be able to exchange data with the control means, notably with via a data communication network 44, for example an LIN network (Local Interconnect Network). The control means are then configured to take account of a brightness level recorded by the sensor 42 to determine the transmission coefficient.

The assistance device will be able to comprise an electrical power supply 46 for the control means 30 and/or for the brightness sensor 42. The electrical power supply 46 is incorporated, for example, in the support or receiver 40. The electrical power supply 46 notably comprises a battery and/or a charger. As a variant and/or in a complementary manner, the device is configured to be linked to an onboard network of the vehicle 20.

The control means 30 will also be able to be configured to exchange information with a mobile data processing terminal 48, such as a mobile telephone, a digital tablet or the like.

The information comprises, for example, a speed of the vehicle 20, this datum being particularly useful to establish the transmission coefficient of the screen with variable light transmission 28 in a relevant manner, in particular correlated with the recorded brightness. It will also be able to be a positioning of the vehicle 20, notably a positioning used by the GPS (Global Positioning System) system, this datum being particularly useful to anticipate strong changes of brightness on entering and/or leaving a tunnel. The control means 30 are configured to take account of the information to determine the transmission coefficient.

According to the preceding aspect of the invention, it will be understood that the control means 30 are dedicated to the device in as much as they are not shared with other applications or incorporated in a data processing device having other functions. Thus, the control means 30 are advantageously configured to be installed permanently on the vehicle 20, notably through the support or receiver 40. In other words, even if the support or receiver 40 is removable, the control means 30 and/or the brightness sensor 42 are designed to remain in the vehicle 20, once fitted.

According to another aspect of the invention, not illustrated, the control means 30 are configured to be mobile with the driver 24 of the vehicle 20. They will in particular be able to be incorporated in the mobile data processing terminal 48. The mobile data processing terminal 48 incorporates, for example, a data medium, that can be read by a microprocessor of the mobile data processing terminal 48, the data medium storing instructions that can be executed by the microprocessor and allowing for the control of the control means 30.

The support or receiver 40 will then be able to be limited to the brightness sensor 42 which will advantageously be made able to communicate with the control means 30 by a wireless communication protocol.

According to this aspect also, the control means 30 are advantageously configured to process one or more types of information out of the speed of the vehicle 20 and/or the positioning of the vehicle 20, among others, and the control means 30 are configured to take account of the information to determine the transmission coefficient.

As a variant, the vehicle speed information will be able to be incorporated as a predefined parameter in the control means 30. The latter will also be able to be configured to allow for the setting of thresholds, notably glare thresholds, and/or to select, out of a number of laws pre-stored in a memory, a filtering law used in calculating the light transmission coefficient.

The invention relates also to a computer program, for example that can be stored in a memory of the mobile data processing terminal 48, the program comprising instructions for remotely controlling the transmission coefficient.

The program will in particular be able to take the form of a digital application that can be downloaded onto the mobile data processing terminal 48 from a digital application server.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for assisting in the driving of a motor vehicle, said assistance device comprising a screen with variable light transmission, intended to be arranged between a road scene (SR) and a driver of said motor vehicle, and control means for controlling a transmission coefficient of said screen with variable light transmission wherein said screen with variable light transmission and said control means are configured so as to be able to be embedded on said motor vehicle as different components of an after-sale product; and
   a brightness sensor for sensing a brightness level outside the motor vehicle, said control means being configured to take account of said brightness level recorded by said brightness sensor to determine said transmission coefficient;
   wherein said brightness sensor communicates with said control means via a data communication network and said control means receives said sensed brightness and determines said transmission coefficient in response thereto with said determined transmission coefficient being used to control said variable light transmission of said screen;
   wherein said screen comprises a pair of spectacles worn by the user.

2. The device as claimed in any claim 1, in which said control means are dedicated to said device.

3. The device as claimed in claim 1, in which said control means are configured to be installed permanently on said motor vehicle.

4. The device as claimed in claim 1, in which said control means are configured to exchange information with a mobile data processing terminal and to take account of data to determine said transmission coefficient.

5. The device as claimed in claim 1, in which said brightness sensor is also configured so as to be able to be embedded on said motor vehicle as a component of said after-sale product, distinct from said screen with variable light transmission.

6. The device as claimed in claim 1, in which said control means are configured to process one or more types of information out of:
- a speed of said motor vehicle;
- a positioning of said motor vehicle;
- and to take account of said one or more types of information to determine said transmission coefficient.

7. The device as claimed in claim 1, in which said device comprises a support incorporating said control means, said support being configured to be fixed in said motor vehicle.

8. The device as claimed in claim 7, in which said support comprises means for electrically powering said control means.

9. The device as claimed in claim 1, in which said control means are configured to be mobile with said driver of said motor vehicle.

10. The device as claimed in claim 9, comprising a mobile data processing terminal, equipped with said control means.

11. A computer program, that can be stored in a memory of said mobile data processing terminal as claimed in claim 10, said computer program comprising instructions for remotely controlling said transmission coefficient.

12. The device as claimed in claim 1, in which said control means are configured to transmit a control signal to said screen with variable light transmission.

13. The device as claimed in claim 12, in which said control means comprise a remote control wave transmitter of remote control waves suitable for transmitting said control signal to a receiver of said screen with variable light transmission, said receiver being able to control said transmission coefficient of said screen with variable light transmission.

14. The device as claimed in claim 13, in which said remote control wave transmitter is configured to transmit said control signal according to a wireless communication protocol.

15. A device for assisting in the driving of a motor vehicle, said assistance device comprising a screen with variable light transmission, intended to be arranged between a road scene and a driver of said motor vehicle, and a control for controlling a transmission coefficient of said screen with variable light transmission wherein said screen with variable light transmission and said control are configured so as to be able to be embedded on said motor vehicle as different components of an after-sale product; and
- a brightness sensor for sensing a brightness level outside the motor vehicle, said control being configured to take account of said brightness level recorded by said brightness sensor to determine said transmission coefficient;
- wherein said brightness sensor communicates with said control via a data communication network and said control receives said sensed brightness and determines said transmission coefficient in response thereto with said determined transmission coefficient being used to control said variable light transmission of said screen;
- wherein said screen comprises a pair of spectacles worn by the user.

16. The device as claimed in any claim 15, in which said control is dedicated to said device.

17. The device as claimed in claim 15, in which said control is configured to be installed permanently on said motor vehicle.

18. The device as claimed in claim 15, in which said device comprises a support incorporating said control, said support being configured to be fixed in said motor vehicle.

19. The device as claimed in claim 18, in which said support comprises means for electrically powering said control.

* * * * *